Jan. 3, 1950 M. HERCEG 2,492,997
MASTICATOR
Filed Nov. 21, 1945 2 Sheets-Sheet 1
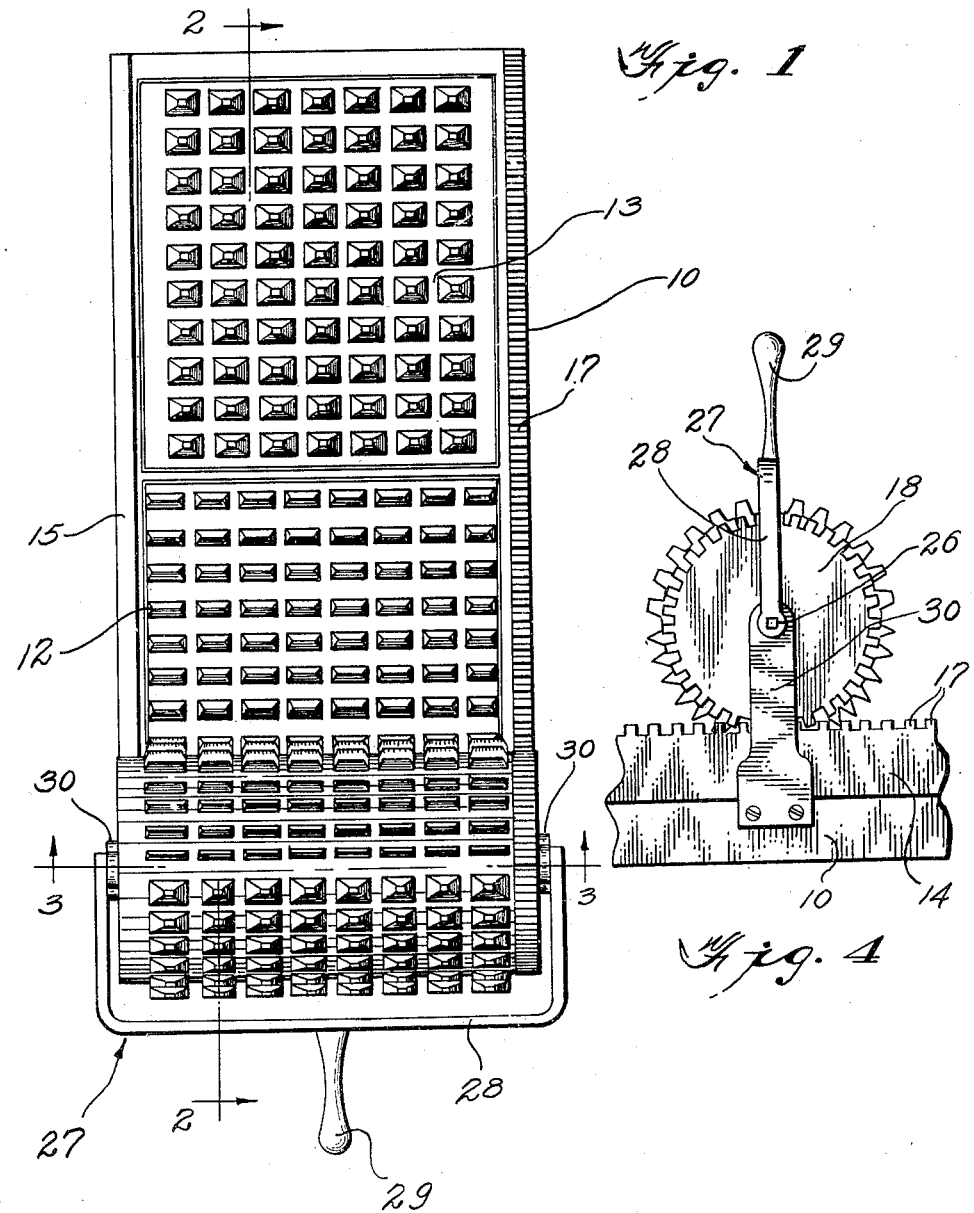
Inventor
Mike Herceg
By Clarence A. O'Brien
and Harvey B. Jacobson
Attorneys Jan. 3, 1950     M. HERCEG     2,492,997
MASTICATOR
Filed Nov. 21, 1945     2 Sheets-Sheet 2
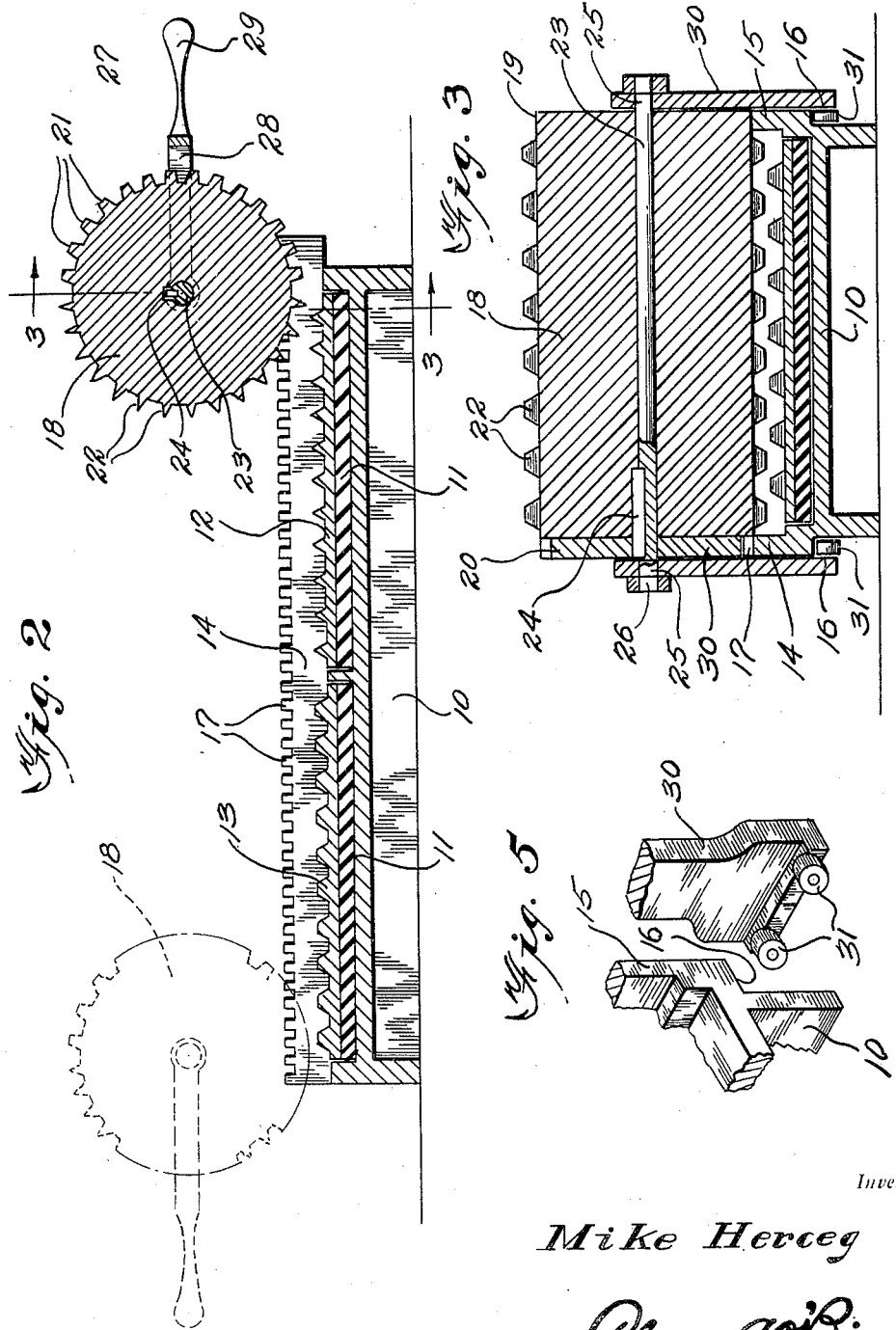
Inventor
Mike Herceg
By Clarence A. O'Brien
and Harvey B. Jacobson
Attorneys Patented Jan. 3, 1950

2,492,997

UNITED STATES PATENT OFFICE 2,492,997

MASTICATOR

Mike Herceg, Winnemucca, Nev.

Application November 21, 1945, Serial No. 630,085

1 Claim. (Cl. 17—27)

This invention relates to a masticator and more particularly to a device for tenderizing meat.

The primary object of the invention is to cut the fibres of a piece of meat without destroying its unity.

Another object is to effect the cutting operation with but a single motion on the part of the user.

A further object is to facilitate the cleaning of the device so as to preserve the sanitary conditions under which the meat is handled.

The above and other objects may be attained by employing this invention which embodies among its features a base having an upstanding rack along one longitudinal side edge, a roller operable over the base and having a gear which is adapted to mesh with the rack so that as the roller is advanced from one end of the base to the other it will be positively rotated, interchangeable plates yieldingly supported on the base and carrying masticating teeth, cooperating masticating teeth on the roller and means to hold the roller in proper spaced position above the base so that when a piece of meat is placed on the plates and the roller moved from one end of the base to the other, a cutting of the fibres of the meat by the masticating teeth will result.

In the drawings:

Figure 1 is a plan view of a masticator embodying the features of this invention.

Figure 2 is a longitudinal sectional view taken substantially on the line 2—2 of Figure 1.

Figure 3 is a transverse sectional view taken substantially on the line 3—3 of Figure 1.

Figure 4 is a fragmentary side view of the device, and

Figure 5 is a fragmentary perspective view of the portion of the base and the hold-down arms.

Referring to the drawings in detail, a base 10 is provided with a pair of longitudinally spaced pockets for the reception of cushioning pads 11 upon which masticating plates 12 and 13 are seated and held against longitudinal movement by engagement with the end walls of the pockets in which the cushions 11 rest. Extending longitudinally of the base 10 along opposite sides are upstanding flanges 14 and 15 and arranged directly below the flanges are outwardly extending shoulders 16 for a purpose to be more fully hereinafter described. The upper edge of the flange 14 is provided with a plurality of spaced rack teeth 17, the purpose of which will be described more fully hereinafter.

A roller 18 having a smooth cylindrical extension 19 at one end and a gear 20 at its opposite end is adapted to cooperate with the base 10, with the smooth cylindrical surface 19 riding on the flange 15 while the gear 20 meshes with the rack teeth 17 so that as the roller is rotated it will be caused to move longitudinally of the base 10. Formed on one half of the periphery of the roller 18 are masticating teeth 21 of the character of punches, while the other half of the roller 18 is provided with peripheral masticating teeth 22 which are of the character of cutting blades. A shaft 23 extends axially through the roller 18 and is keyed as at 24 to the roller and the gear 20 so that the roller, gear and shaft will rotate in unison. The shaft is provided adjacent opposite ends with smooth cylindrical portions 25 and at its extreme ends with squared portions 26. A handle designated generally 27 comprising a U-shaped frame 28, the legs of which are provided adjacent their ends with rectangular openings, is adapted to engage the shaft 23 with the squared ends 26 of the shaft engaging the rectangular openings in the ends of the legs of the U-shaped member 28 so that when the U-shaped member is moved as by rotating the knob 29 about the axis of the shaft, the roller 18 will be rotated and caused to travel into the dotted line position illustrated in Figure 2 at one end of the base 10.

In order to hold the roller 18 in proper position on the base 10, a pair of arms 30 depend from the cylindrical portions 25 of the shaft 23 between the ends of the roller and the legs of the U-shaped member 28 and each of these arms adjacent its lower end carries a pair of spaced guide rollers 31 which are adapted to engage under the shoulders 16 so that any lifting movement of the roller 18 will be resisted.

In use, it will be understood that a piece of meat to be tenderized is placed upon the masticating teeth of the plates 12 and 13 and the roller is then moved longitudinally of the device by rotating the handle 27 which movement simultaneously advances the roller along the base 10 and causes the teeth 21 and 22 to contact the upper side of the piece of meat resting on the plates 12 and 13, while the masticating teeth on these plates engage the underside of the meat. In this way, the fibres of the meat are cut in a crisscross fashion without actually separating or cutting the meat into small pieces with the result that it may be removed from the plates 12 and 13 as a unit for further preparation. It is to be noted that the plate 13 is provided with what may be termed punching teeth, while the plate 12 is provided with cutting teeth. By removing the plates and transposing them it will be obvious that the punching teeth of one plate may be caused to align with the punching teeth on the roller and the cutting teeth likewise can be caused to align with the cutting teeth on the roller, depending on the type of mastication that is desired. For all intents and purposes, however, it has been found most satisfactory to utilize the device with the punching teeth of the plate 13 cooperating with the cutting teeth 22 of the roller and the cutting teeth of the plate 12 cooperating with the punching teeth 21 of the roller. Inasmuch as the roller 18 is held against lifting motion it is obvious that where the thickness of a slice of meat may vary, the cushions 11 upon which the plates 12 and 13 are supported will compensate for these variations in thickness by allowing the plates to be depressed as the roller is moved across the slice or slab of meat placed on the plates.

While in the foregoing there has been shown and described the preferred embodiment of this invention it is to be understood that minor changes in the details of construction, combination, and arrangement of parts may be resorted to without departing from the spirit and scope of the invention as claimed.

I claim:

A masticator comprising a base, upstanding flanges along the longitudinal side edges of the base, cushions carried by the base between the flanges, interchangeable plates supported on the cushions, masticating teeth projecting upwardly from the plates, rack teeth carried by one of the flanges, the base having longitudinally extending shoulders beneath the flanges, a roller, a gear at one end of the roller for engagement with the rack teeth to advance the roller longitudinally of the base as the roller rotates, a cylindrical portion of the opposite end of the roller for smooth rolling movement on the flange opposite that carrying the rack teeth, a shaft extending through the roller for rotation therewith, a guide arm rotatably mounted adjacent each end of the shaft, guide and hold-down rollers on each guide arm for engagement beneath the shoulders on the base, masticating teeth on the roller for cooperation with the masticating teeth on the plates, and a handle fixed to the shaft whereby when the handle is rotated the roller will rotate in unison therewith and advance along the base over the plates.

MIKE HERCEG.

REFERENCES CITED

The following references are of record in the file of this patent:

UNITED STATES PATENTS

| Number | Name | Date |
| --- | --- | --- |
| 454,330 | Cady | June 16, 1891 |
| 824,319 | Tolen | June 26, 1906 |
| 1,979,494 | Sanford | Nov. 6, 1934 |